US010180792B1

(12) United States Patent
Gaertner et al.

(10) Patent No.: US 10,180,792 B1
(45) Date of Patent: Jan. 15, 2019

(54) CACHE MANAGEMENT IN DATA STORAGE SYSTEMS

(71) Applicant: Seagate Technology LLC, Cupertino, CA (US)

(72) Inventors: Mark Gaertner, Vadnais Heights, MN (US); James D Sawin, Sterling, MA (US)

(73) Assignee: Seagate Technology LLC, Cupertino, CA (US)

( * ) Notice: Subject to any disclaimer, the term of this patent is extended or adjusted under 35 U.S.C. 154(b) by 82 days.

(21) Appl. No.: 14/701,447

(22) Filed: Apr. 30, 2015

(51) Int. Cl.
*G06F 12/00* (2006.01)
*G06F 3/06* (2006.01)

(52) U.S. Cl.
CPC ............. *G06F 3/061* (2013.01); *G06F 3/068* (2013.01); *G06F 3/0614* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,078,992 A | 6/2000 | Hum | |
| 7,308,531 B2 | 12/2007 | Coulson | |
| 7,411,757 B2 | 8/2008 | Chu et al. | |
| 7,644,231 B2 | 1/2010 | Recio et al. | |
| 8,560,759 B1 | 10/2013 | Boyle et al. | |
| 2008/0024899 A1* | 1/2008 | Chu | G06F 3/0614 360/69 |
| 2012/0233398 A1* | 9/2012 | Ninomiya | G06F 12/0811 711/113 |
| 2015/0012690 A1* | 1/2015 | Bruce | G06F 12/0811 711/103 |

* cited by examiner

*Primary Examiner* — Baboucarr Faal
(74) *Attorney, Agent, or Firm* — Cesari & Reed, LLP; Kirk Cesari; Logan Brown (57) ABSTRACT

Data storage devices may store selected data received from a data source to a buffer memory. The selected data may be copied from the buffer to a non-volatile memory configured for sequential storage. The selected data may then be copied from the buffer to a solid state memory, such as dynamic random access memory. The selected data may be copied from the solid state memory to a main store, such as a magnetic disc memory. If the selected data cannot be found in the solid state memory, the selected data in the non-volatile memory can be copied to the main store.

21 Claims, 7 Drawing Sheets

CACHE MANAGEMENT IN DATA STORAGE SYSTEMS

SUMMARY

In some embodiments, a system can include a first solid state memory ("SSM"), a second SSM, a first non-volatile memory ("NVM") configured to store selected data in a sequential manner, and a second NVM. Further, the system may include a circuit configured to store the selected data from the first SSM to the first NVM, store the selected data from the first SSM to the second SSM, and store the selected data from the second SSM to the second NVM.

In some embodiments, a method can include receiving selected data from a data source, storing the selected data to a first solid state memory ("SSM"), storing the selected data from the first SSM to a first non-volatile memory ("NVM"), where the first NVM is configured for sequential storage, storing the selected data from the first SSM to a second SSM, and storing the selected data from the second SSM to a second NVM.

In some embodiments, a system can include a first solid state memory ("SSM"), a second SSM, a first non-volatile memory ("NVM") configured to store selected data in a sequential manner, and a second NVM. Further, the system can include a circuit configured to read the selected data from at least one of the first SSM, the second SSM, the first NVM, and the second NVM based on a location of the selected data and performance characteristics of the first SSM, the second SSM, the first NVM, and the second NVM.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a data storage device, such as a disc drive, solid state drive, a hybrid hard drive, a data server, or any combination thereof. Dedicated hardware including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor to perform the methods.

Of primary concern when storing data to a hard drive is reliability and speed. However, writing (and reading) to a disc memory can be slow and resource intensive since a recording head must traverse multiple tracks and sectors to store write data (i.e. data from a host received for storage) to a proper location. In some instances, a disc may have at least two partitions, such as a main store and a media cache. The main store can be a partition of the disc memory configured to store large quantities of data, often to non-sequential locations. The media cache can be a partition of the disc memory configured to store write data to sequential physical storage blocks for fast writing performance. In some cases, the media cache may be physically distributed across the disc memory, or another nonvolatile memory, and may include one or more sequential access regions. At some later time, the write data may be moved from the media cache to a main store. The use of a media cache can increase the writing speed (i.e. throughput) of a hard drive.

Figure 1:
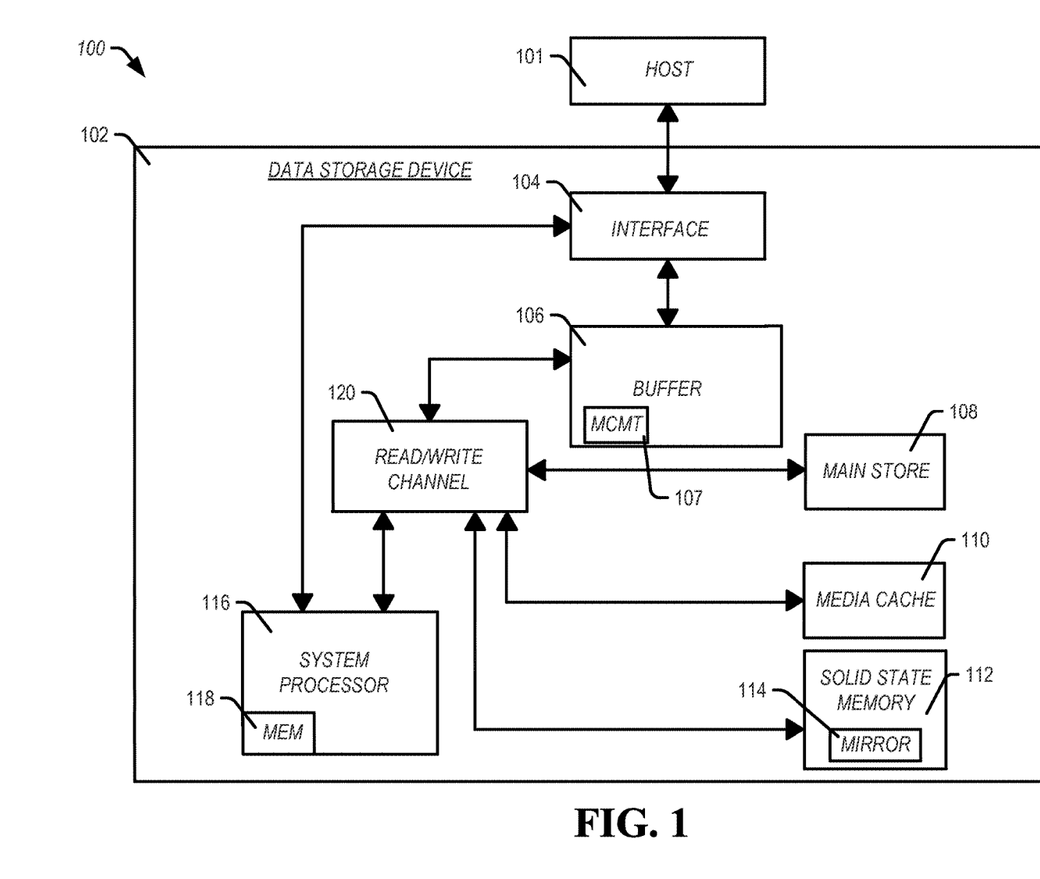
FIG. 1 is a diagram of a system of Cache Management in Data Storage Systems, in accordance with certain embodiments of the present disclosure.

Referring to FIG. 1, a diagram of a system of Cache Management in Data Storage Systems is shown and generally designated 100. Data storage device ("DSD") 102 can optionally connect to be removable from a host device 101, which can be a computer, a host bus adapter, a bus expander, a server, a telephone, a music player, another electronic device, or any combination thereof. The DSD 102 can communicate with the host device 101 via the hardware and firmware based host interface circuit 104 that may include a connector that allows the DSD 102 to be physically connected and physically disconnected from the host device 101.

The DSD 102 can include a system processor 116 and associated memory 118. The system processor 116 may be part of a system on chip (SOC). A buffer 106 can temporarily store data during read and write operations and can include a media cache management table ("MCMT") 107. In some cases, the buffer 106 can be a volatile memory, such as a dynamic random access memory ("DRAM"), static random access memory ("SRAM"), or other volatile memory. Further, the DSD 102 can include a read/write (R/W) channel 120 which can encode data during write operations and decode user data during read operations. The R/W channel 120 may be coupled to a solid state memory ("SSM") 112, such as via a formatter and buffer manager logic located between the R/W channel 120 and the SSM 112. The SSM 112 may be a volatile memory, such as DRAM, although in some examples, the SSM 112 may be a non-volatile solid state memory ("NVSSM"), such as flash memory, Ferroelectric RAM (FRAM), or other memory. In some embodiments, some portions of the SSM 112 may be volatile memory while other portions of the SSM 112 may be non-volatile memory. Further, the SSM 112 can include a media cache mirror 114. The media cache mirror 114 may be a reserved portion of the SSM 112. For example, the media cache mirror 114 may be a physical portion (i.e. reserved amount) of the SSM 112 reserved for mirrored caching. In some embodiments, the media cache mirror 114 may be integrated with the SSM 112. In some cases, the media cache mirror 114 may be separate from the SSM 112.

In some embodiments, R/W channel 120 may be coupled to a main store 108. The main store 108 may be a non-volatile memory, such as magnetic disc memory or NVSSM.

In some embodiments, the R/W channel 120 may be coupled to a media cache 110. The media cache 110 may be a cache that resides on a media cache partition of the main store 108. The media cache partition may be a portion of the main store 108 reserved for the media cache 110. The media cache 110 may have one or more circular log structures, and can store user data and metadata. The metadata may include headers and footers, and may be used in conjunction with the MCMT 107 to reconstruct the media cache 110 in the event of a power loss (see FIG. 3). In some embodiments, the total capacity and number of logical block address ("LBA") ranges in the media cache 110 may be larger than what may be retained in the buffer 106.

The media cache 110 can provide performance benefits for non-sequential writes since it may be faster to write data sequentially to the media cache 110 rather than randomly to the main store 108. The media cache 110 may allow a large amount of data to be available and aggregated, potentially reducing the number of disc write operations to the main store 108 and potentially reducing the number of rotations of the disc for write operations; also, a deep queue of localized cleaning writes (e.g. write flush operations, that is, write operations moving data from the SSM 112 to the main store 108) can be generated for higher average inputs/outputs per second, in addition to other benefits and advantages. In some cases, localized cleaning writes can aggregate multiple write commands into a single write command. Since the media cache 110 can contain potentially thousands of write operations, the scheduling of those writes from the media cache mirror 114 to the main store 108 can be done in a way that greatly minimizes seek and latency times.

During operation, the DSD 102 may receive input or output commands from the host 101. In some examples, an input command may be a write command or other command. In some examples, an output command may be a read command or other command. Write data corresponding to an input command may be received from the host 101 by the interface 104 and stored to the buffer 106. In some embodiments, the R/W channel 120 can store the write data from the buffer 106 to the media cache 110 and then from the buffer 106 to the media cache mirror 114. The MCMT 107 can keep track of the location of the write data in both the media cache 110 and media cache mirror 114. At some point in time, the write data may also be copied to the main store 108.

When the write data is to be transferred to the main store 108, the DSD 102 can copy the write data from the media cache mirror 114 to the main store 108. If some of the write data is in the media cache mirror 114 and the media cache 110, the write data in the media cache mirror 114 and the media cache 110 may be merged to produce merged data and stored to the main store 108. If the write data is not available in the media cache mirror 114, the write data may be copied from the media cache 110 to the main store 108. If the write data is not stored in the media cache 110 or media cache mirror 114, the write data may be stored directly to the main store 108.

When the host 101 requests data, the DSD 102 may parse multiple caches to determine where the requested data can be serviced from. The requested may be stored in the main store 108, media cache 110, media cache mirror 114, or any combination thereof. The DSD 102 may attempt to retrieve the data from the fastest memory in which the corresponding data is available. In some cases, the fastest memory may be the buffer 106. When the data is not available in the buffer 106, DSD 102 may attempt to retrieve the data from the next fastest memory, which may be the mirror 114. If the data is not available in the media cache mirror 114, the DSD 102 may attempt to retrieve the data from the media cache 110. If the data is not available in the media cache 110, the DSD 102 may retrieve the data from the main store 108. When portions of the data are located in different memories, the portions of the data may be retrieved from a combination of the memories, may be merged, and provided to the host 101 via the interface 104. The retrieval of data may include retrieving the requested data, in whole or a portion thereof, from any combination of the different memories.

Figure 2:
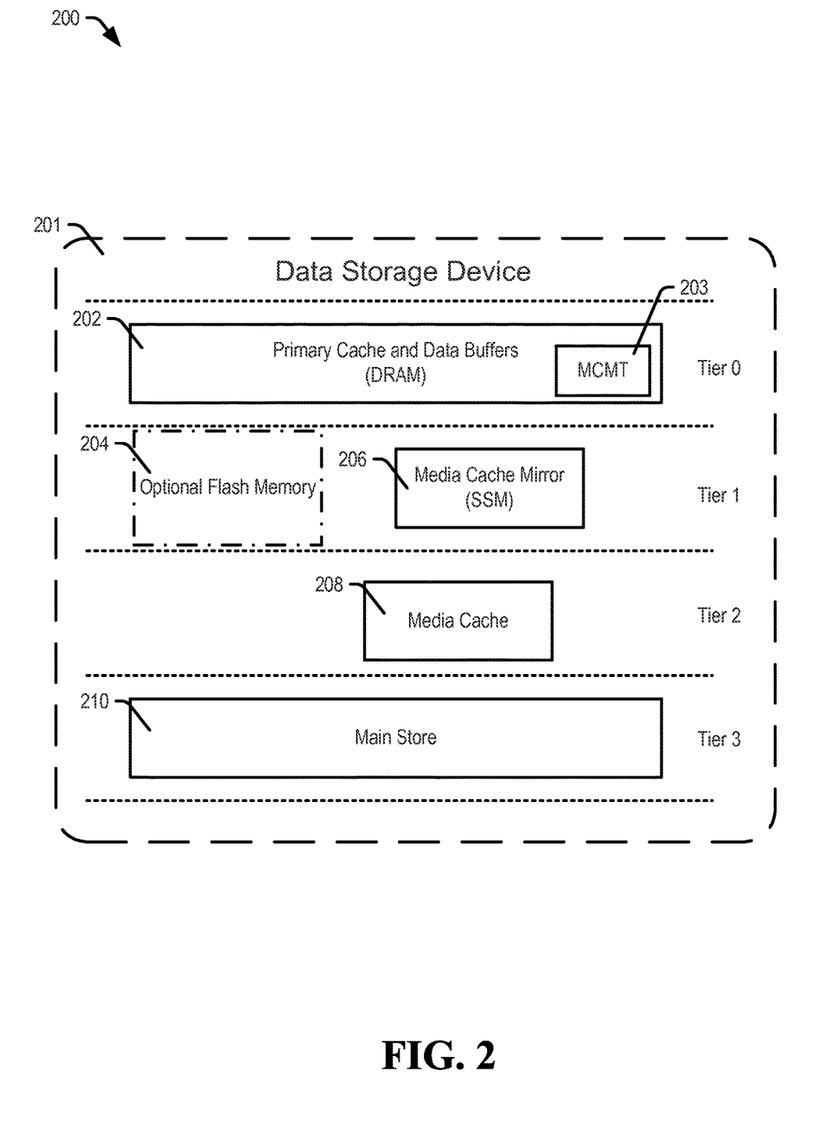
FIG. 2 is a diagram of a system of Cache Management in Data Storage Systems, in accordance with certain embodiments of the present disclosure.

Referring to FIG. 2, a diagram of a system of Cache Management in Data Storage Systems is shown and generally designated 200. The system 200 is an example cache hierarchy of system 100, according to certain embodiments. The system 200 can have a DSD 201, which can include a primary cache and data buffers ("primary cache") 202, MCMT 203, optional flash memory 204, media cache mirror 206, media cache 208, a main store 210.

The DSD 201 can be viewed as a tiered storage architecture in which user data resides in one or more tiers. The tiers may be organized by relative size, speed of access, and not necessarily by order of data flow. The DSD 201 may read and write data in tier order, if possible, to take advantage of the relative speed advantages of the top tiers. In some embodiments, the DSD 201 may read and write data to a tier or memory based on an optimal solution. The optimal solution may be based on performance characteristics of the memories and storage requirements of data (e.g. fast access times, high reliability, etc.). The performance characteristics can include data transfer rate, data access time, endurance characteristics, reliability characteristics, other characteristics, or any combination thereof.

Tier 0 may include the primary cache 202. Tier 0 may be the fastest tier, and may include DRAM storage. In some embodiments, primary cache 202 can include the media cache mirror 206. A portion of the primary cache 202 may store read data or write data. The write data may be stored from the primary cache to a memory on tier 1, a memory on tier 2, a memory on tier 3, or any combination thereof.

Tier 1 can have the media cache mirror 206 and the optional flash memory 204. In some embodiments, Tier 1 may include a volatile SSM (e.g. DRAM), NVSSM (e.g. flash), or both. In some cases, the media cache mirror 206 and the optional flash memory 204 may have faster read access times or read or write transfer rates than memory in tiers 2 or 3. In some embodiments, the media cache mirror 206 may be DRAM or other volatile memory. In some cases, the media cache mirror 206 may be a non-volatile solid state memory, such as NAND flash. For example, the media cache mirror 206 may be a portion of the primary cache 202. In other examples, the media cache mirror 206 and the primary cache 202 may be within a same SSM. The media cache mirror 206 may contain read data, stale or invalid write data (i.e. a newer valid version of the write data is available in a faster tier), or write data awaiting storage to the main store 210. The optional flash memory 204 may include the media cache mirror 206. In some examples, the optional flash memory 204 may be a read only cache, and may be coherent with the main store 210. In some embodiments, the DSD 201 may attempt to store data to, or read data from tier 1 before tiers 2 and 3.

Tier 2 may be media cache storage, and may include the media cache 208. The media cache 208 may contain stale/invalid write data or write data awaiting storage to the main store 210. Tier 2 may have slower access times or transfer rates than tiers 0 and 1.

Tier 3 may be the main store 210, such as disc storage or an NVSSM main store. Tier 3 may have the slowest access times or transfer rates of all of the tiers, but may have the largest storage capacity, among other benefits.

Figure 3:
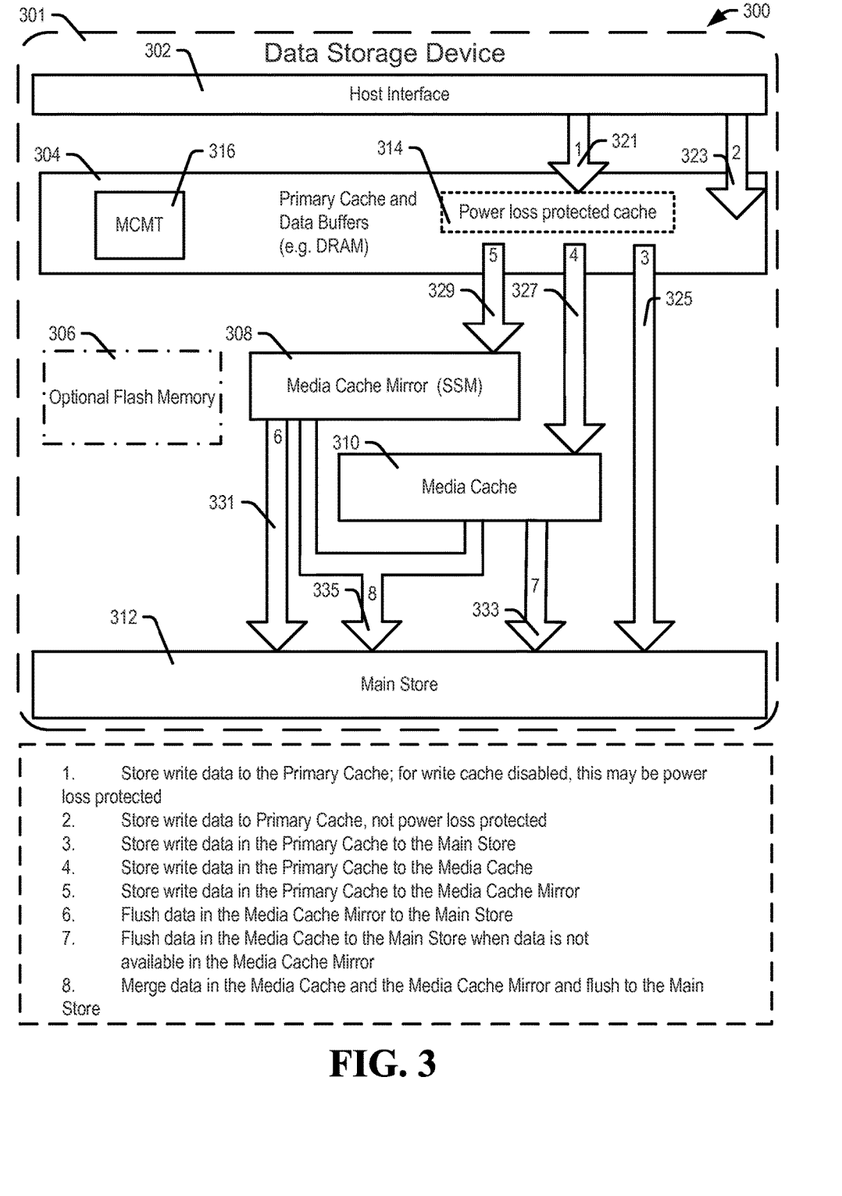
FIG. 3 is a diagram of a system of Cache Management in Data Storage Systems, in accordance with certain embodiments of the present disclosure.

Referring to FIG. 3, a diagram of a system of Cache Management in Data Storage Systems is shown and generally designated 300. The system 300 is an example of systems 100 and 200, according to certain embodiments. The system 300 can include a DSD 301, host interface 302, primary cache 304, and main store 312. In some embodiments, the primary cache 304 may be the buffer 106. The primary cache 304 can have a power loss protected portion, which may be a power loss protection cache ("PLPC") 314 and MCMT 316. In some embodiments, the PLPC 314 is optional.

During operation, write data may be stored from a host to the primary cache 304 via the host interface 302, at 321. Some of the write data may be write cache enabled ("WCE") or write cache disabled ("WCD"). WCE data may not need to be power loss protected, and a transfer status update may be sent to a host once the WCE data is stored to the primary cache 304. In some embodiments, the WCE data may be stored from the primary cache 304 to the main store 312 or a media cache mirror 308. In some examples, the WCD data may be power loss protected. The PLPC 314 may allow a portion of the primary cache 304 to be protected from data loss in the event of a power loss. If power is lost, the power loss protected data can be copied from the primary cache 304 to a non-volatile storage, such as the media cache mirror 308, or other non-volatile memory, using temporary backup power. Sources of backup power may be capacitor storage, back electromotive force of a voice coil motor, and so forth. The maximum amount of data (i.e. the size of the PLPC 314) that can be protected may be determined by how long the temporary backup power is determined to persist, and a speed at which the WCD data can be reliably written to a non-volatile storage. In some cases, the PLPC 314 can be configured to store metadata corresponding to the WCD data. With the PLPC 314, a transfer status update may be sent to a host once the WCD data is power loss protected, thus allowing more WCD data to be accumulated and aggregated in the primary cache 304 prior to filling into the media cache 310 or the main store 312.

The DSD 301 can store the WCE data or WCD data from the primary cache 304 to a lower tier, such as the main store 312. In some embodiments, WCE or WCD data may be stored directly to the main store 312 from the primary cache 304, at 325. For example, this can happen when the cached data is not a candidate for media caching (see FIG. 4 for more details).

Write data that is a candidate for media caching may be stored to the media cache 310 and media cache mirror 308. The write data can be stored to the media cache 310, at 327, and then the same write data can be mirrored in the media cache mirror 308, at 329. Write data may be stored to the media cache mirror 308 and then to the media cache 310, or vice versa. In some embodiments, storage capacity of the media cache 310 and media cache mirror 308 may be substantially the same; however, they can be different in size.

The DSD 301 can determine in which cache memory the write data is located using information in the MCMT 316. The MCMT 316 can keep track of extents (sequential LBAs) that are valid in the media cache 310, media cache mirror 308, and optionally the optional flash memory 306. For example, the MCMT 316 can map sequential ranges of LBAs. The structure of the MCMT 316 can allow for fast searches and traversal of extents in LBA order. In some cases, the MCMT 316 may be periodically saved to the main store 312. In some embodiments, the MCMT 316 may be power loss protected by the PLPC 314.

The DSD 301 can selectively store write data from any of the caches to the main store via numerous variations of accessing the different storage tiers, which may be based on different conditions or triggers. For example, the write data may be flushed to the main store 312, at 331, when a level of saturation of LBA ranges in the media cache mirror 308 is exceeded or based on another trigger that indicates the write data should be flushed to the main store. When write data is in the media cache 310, the write data may be flushed to the main store 312, at 333, based on one or more triggers. In some circumstances, portions of the write data may be located in the media cache 310 and the media cache mirror 308, or in another cache. The DSD 301 can merge the portions together, and the write data can be stored to the main store 312 (or other memory), such as at 335.

In some embodiments, the data in the media cache 310 may be organized into media cache segments (i.e. packets) that contain both user data and metadata. In some embodiments, the media cache segments may include one or more LBA extents which may not be logically contiguous. The metadata may be used along with a latest saved MCMT snapshot (i.e. saved copy) to reconstruct a last known state of the media cache 310 in the event of a power loss. Media cache segments may be built and written periodically from cache candidate data in the primary cache 304.

Flushing of data from one or more of the tiers may be based on time, level of cache fullness, other criteria, or any combination thereof. For example, the media cache 310 may be cleaned to the main store 312 periodically. A cleaning pass can collect valid write data from the media cache mirror 308 or media cache 310 in age order, sort extents by LBA, aggregate the extents where possible, and issue cleaning disc write commands to a disc queue for rotational position sorting. Cleaned extents may be removed from the media cache mirror 308 or media cache 310, making room for new write data. In some cases, cleaning extents may be cleaned (i.e. flushed) from the media cache mirror 308 or media cache 310 using an age-based criterion in LBA order. This can allow write data to be retrieved from media cache mirror 308 in time for scheduled cleaning writes. In some examples, an aggregation of cleaning extents can be expanded to include scatter-gathering (i.e. combine cleaning extents separated by small LBA gaps) or coalescing (i.e. combine cleaning extents that are adjacent or overlapping), or both.

Figure 4:
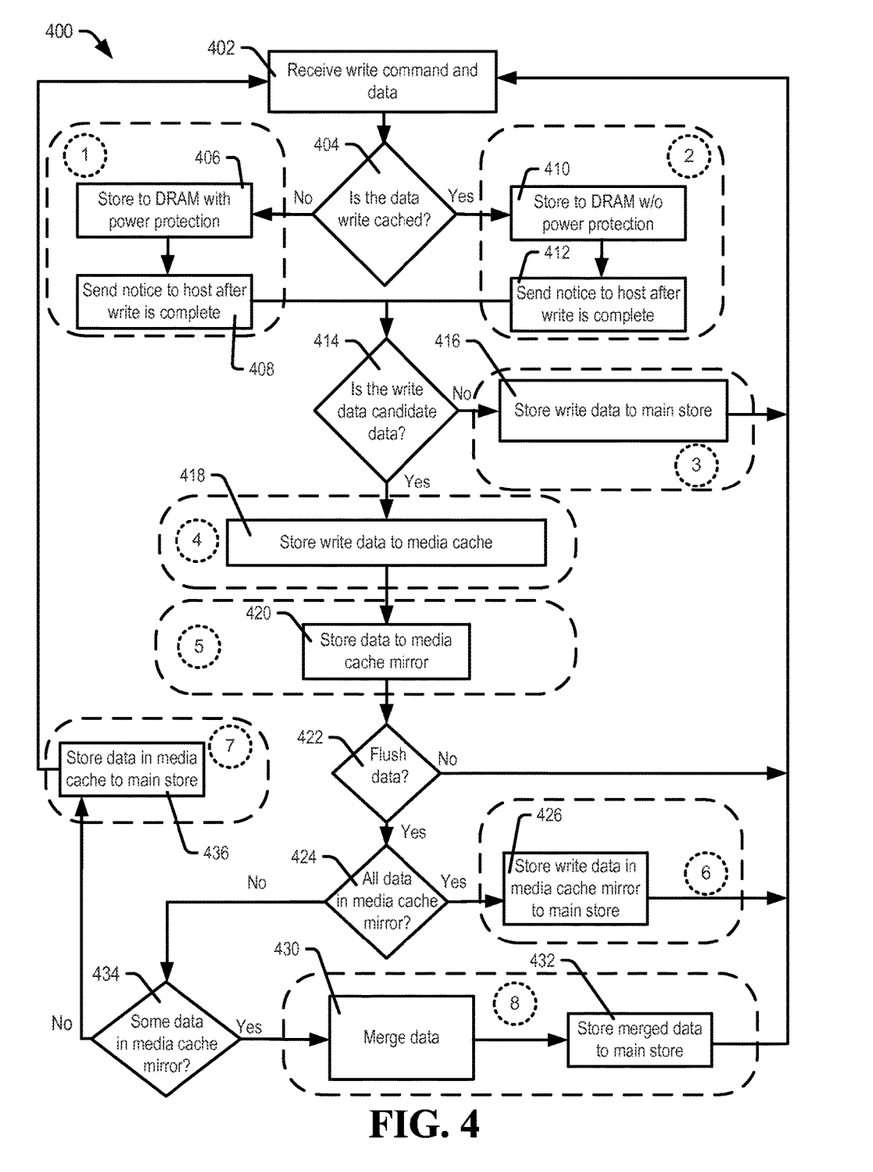
FIG. 4 is a flowchart of a method for Cache Management in Data Storage Systems, in accordance with certain embodiments of the present disclosure.

Referring to FIG. 4, a flowchart of a method of Cache Management in Data Storage Systems is shown and generally designated 400. The method 400 is an example implementation of the system 300, in accordance with certain embodiments. The method 400 can begin when a write command corresponding to write data is received, at 402.

The method 400 can determine if the write command is a WCD or WCE command, at 404. In some cases, a WCE command may be a global setting. However, in some embodiments, a WCE command may be a per write command setting. When the write command is WCE, the write data may be stored to a primary cache, at 410, and a notice that the write data has been stored can be sent to a host, at 412. When the data is WCD, the WCD data may be power loss protected and stored to a PLPC, at 406, and a notice of completion may be sent to a host, at 408. In some embodiments, the WCD data may not be power loss protected. In some cases, the WCD data may be stored in DRAM and then written to a main store, after which a notice of completion may be sent to a host, at 408. Transfer status may be provided for a write command. If PLPC is present, status may be sent to the host upon receiving the data in the PLPC, at 408. If PLPC is not present, then status can be sent after writing the data to main store (e.g. 312) or media cache (e.g. 310), at 412.

The method 400 can include determining if storing the write data to the media cache is an optimal storage solution, at 414. Storing the write data to the media cache may be an optimal storage solution unless any one of the following are true:

- the write data can be sequentially merged with another non-cached write. For example, a write command corresponding to LBAs 100-149 may be received at time A, and a write command corresponding to LBAs 150-180 may be received at time B. These two writes can be aggregated into a single write of LBAs 100-180. If the aggregated write is large enough, it may be more efficient to write directly to main store;
- the write command meets the conditions for starting an initial stream. If a host is writing enough sequential data, then it may be more efficient to bypass the media cache and write directly to the main store. A DSD can use heuristic algorithms to detect data access patterns it believes to be the start of such a sequential write. When such a sequential write is detected, the write data may bypass the media cache;
- the DSD is coming out of a standby power mode, the command is a WCD skipmask write, or both. A skipmask write may be a specialized write command that allows the host to write data that is nearly sequential. The skipmask write can include a beginning LBA, and a bit mask with 1's indicating that an LBA may be written, and 0's indicating LBA's can be skipped. For example, LBA 8, bit mask 10011 can mean write LBA 8, skip 9 and 10, and write LBAs 11 and 12. Thus, only 3 LBAs worth of data would be provided by the host;
- the command is a force unit access command. A force unit access may be an option indicated on a received command that tells the DSD to write the data to a non-volatile memory. In some implementations, this is interpreted as write to main store;
- a transfer length of the write data to a media cache or media cache mirror exceeds a maximum threshold; or
- the write command is a non-performance critical command, the LBA range overlaps an LBA range of another pending operation, or both. Write data may be disqualified from media caching for internal implementation issues, to resolve timing issue with other commands to the same LBA space, or for performance optimization reasons.

The write command may be executed as a "connected" transfer when the write command is not media cached. A connected transfer is when the write data is stored to the main store from the primary cache without being media cached. The write data may be stored to the main store, at 416. After the connected transfer is complete, some or all of the write data may be validated in the primary cache for future read hits. The method 400 can repeat, at 402.

The method 400 can include storing the write data from a primary cache to a media cache, at 418, and then from the primary cache to a media cache mirror, at 420. In some cases, operations 418 and 420 may be switched in order. In some examples, the media cache mirror may receive the write data immediately after the media cache has received the write data. In some cases, new write data may not be stored to the media cache until prior write data has been stored to the media cache mirror.

After the write data has been saved to the media cache mirror and media cache, the method 400 can determine if the write data in the media cache mirror and media cache should be flushed, at 422. In some cases, the write data may be flushed from the media cache mirror or media cache when a number of write data extents exceeds a threshold, timing (e.g. age of data in the media cache), host indicator (e.g. shutdown, disconnect, etc.), and so forth. When the write data is not flushed, the method 400 can repeat, at 402, or the method 400 may pause until a flush command or new write command(s) is received.

When the write data is to be flushed, it may be necessary to determine where a valid copy(s) of the write data is located. The method 400 can determine if all of the valid write data is in the media cache mirror, at 424. When all of the write data is stored in the media cache mirror, the method 400 can include flushing the write data from the media cache mirror to the main store, at 426, then returning to a state to receive write commands and data, at 402.

When some of the write data is not stored in the media cache mirror, the method 400 can determine if some of the write data is located in both the media cache mirror and media cache, at 434. When the write data exists in both the media cache and media cache mirror or another cache, the write data may be merged from the media cache and the media cache mirror or any other cache location, at 430, and stored to the main store, at 432. In some embodiments, data may be flushed from the media cache mirror to the main store, and any remaining data not already accounted for may be stored to the main store from the media cache.

It should be understood that the methods listed above can be applied to any data, including write data, system data, and so forth.

Figure 5:
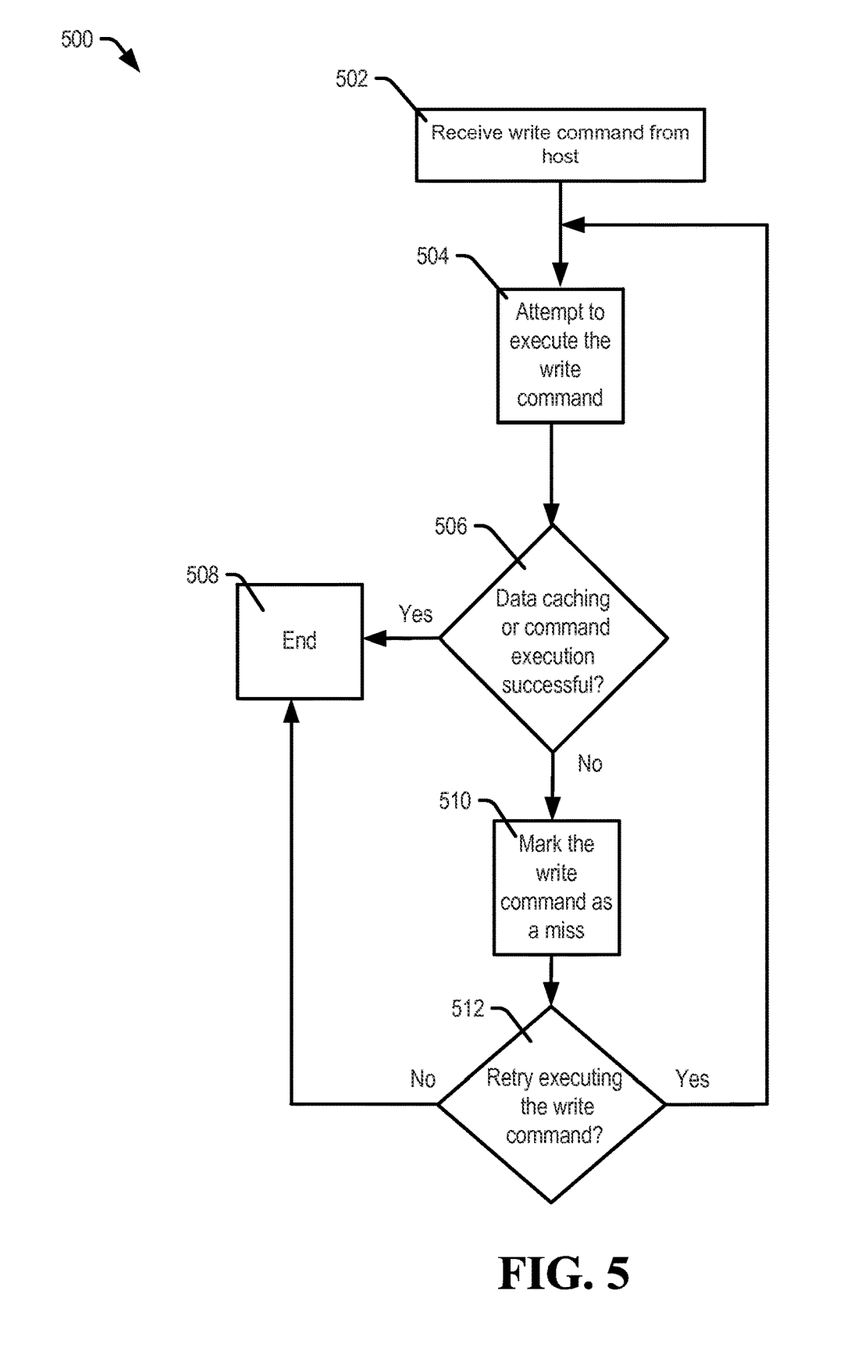
FIG. 5 is a flowchart of a method for Cache Management in Data Storage Systems, in accordance with certain embodiments of the present disclosure.

Referring to FIG. 5, a flowchart of a method of Cache Management in Data Storage Systems is shown and generally designated 500. The method 500 is an example implementation of the system 300, in accordance with certain embodiments.

In some circumstances, a DSD may fail to cache write data. Write commands that fail to be executed may be referred to as "missed". Write commands may be missed if an execution of the write command would overlap an active disc operation, there are no available metadata locations remaining to track write cache data, the write command qualifies as a cached storage write but there is an insufficient amount of available storage space, or any combination thereof. In some cases, the write command may be marked as a miss when it qualifies as a media cache write and is power loss protected or a write cache candidate, but media cache candidate write commands are currently throttled in order to balance a media cache filling rate with a cleaning rate.

The method 500 can include receiving write commands from a host, at 502. In some cases, the write command can include write caching. The method 500 can include attempting to execute the write command, at 504. Write data corresponding to an executed write command may be power loss protected and stored to a media cache. The method 500 can include determining if the write command was executed, at 506. When the write command was successfully executed, the method 500 can end, at 508. When the write command was not successfully executed, the write command may be marked as a miss, at 510. In some embodiments, the method 500 may determine if another attempt to execute the write command should be tried, at 512. In some cases, the method 500 may determine to retry executing the write command when resources are potentially freed (e.g. disc transfers are complete). When execution of the write command is to be retried, the method can attempt to execute the write command, at 504. The method 500 can end, at 508.

Figure 6:
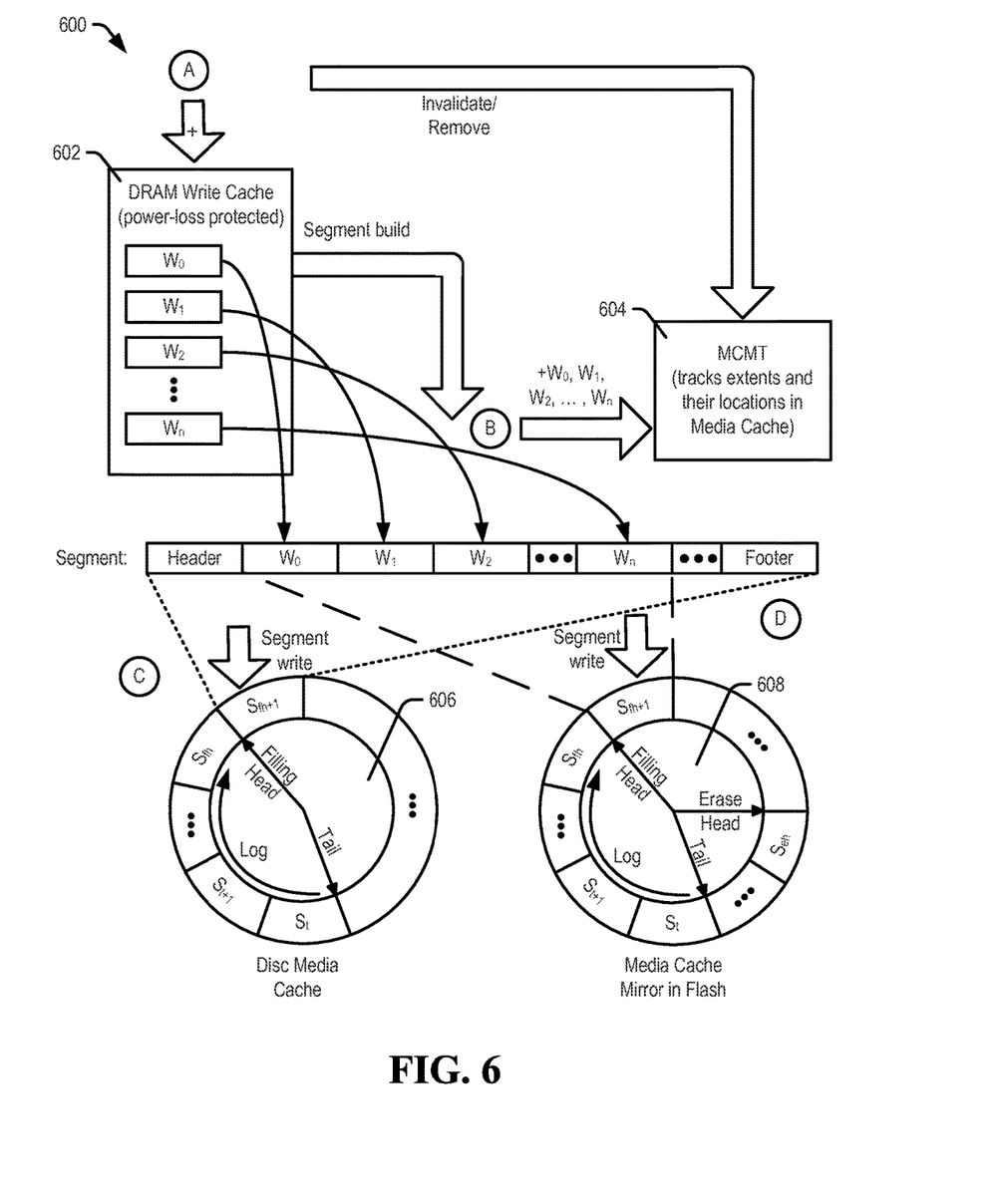
FIG. 6 is a diagram of a system of Cache Management in Data Storage Systems, in accordance with certain embodiments of the present disclosure.

Referring to FIG. 6, certain embodiments of Cache Management in Data Storage Systems are shown and generally designated 600. The system 600 is an example of system 300, according to certain embodiments. The system 600 may include a primary cache 602, MCMT 610, media cache 612, and media cache mirror 614. The primary cache 602 may be DRAM, and can include write data LBA ranges $W_0$ through $W_n$. The number "n" of LBA ranges may be based memory capacity and a finite ability to track cached data. For example, the metadata for the media cache 612 may be represented as a table or a b+ tree having a maximum number of entries.

During operation, write data from the primary cache 602 may be stored to the media cache 612 and media cache mirror 614. Write data corresponding to LBAs $W_0$ through $W_n$, may be aggregated in the primary cache 602, at "A". In some instances, the write data may be a candidate for the media cache 612 if one or more of the following conditions are met:
  a write command corresponding to the write data is write cache enabled or power loss protected, and the write data has been transferred into a cache and a corresponding LBA range(s) has been invalidated in the MCMT 604;
  the command is not sequential (or not near sequential) to another queued command;
  the write command is write cache enabled or power loss protected and is not scatter-gathered;
  the write command's transfer size does not exceed a maximum threshold;
  the write data is valid and not in use to service an active read;
  the write command is not involved in an active coalesce operation; and
  a host-forced media cache flush is not in progress; and an MCMT or journal write has not failed.

In some instances, more or fewer conditions may apply. For example, an additional condition may include requiring commands that are not sequential (or not near sequential) to another queued command to have been stored at least a threshold period of time and to have an extent less than a threshold length.

A segment write operation may be issued causing the aggregated write data to be packaged into one or more media cache segments (i.e. packets). The LBA ranges corresponding to the write data can be stored to the MCMT 604, at "B". Segment write commands may be considered when non-performance sensitive commands are received, a cleaning burst is completed and cleaning is suspended due to host-provided disc work (the prior cleaning activity may have made more room in the media cache 612 to be filled), disabling a PLPC with write data, a number of newly received cached writes exceeds a threshold, a number of newly cached writes exceeds a threshold, or periodically. In some cases, a segment write command may not be issued if any of the following are true: the media cache 606 is disabled; there is no more media cache capacity; less than a threshold number of available extents exist in the MCMT 604 (cleaning may be require to free up some of the extents); segment writes are temporarily disabled; mode page settings (i.e. configuration settings made available to a host via an interface such as a small computer system interface ("SCSI") or serial attached SCSI ("SAS")) do not permit any cached writes.

The one or more media cache segments may be written to the media cache 606, at "C". In some embodiments, the media cache 606 (or media cache mirror 608) segments may be organized into a log, where a log begins with a filling head and ends with a tail. In some cases, a filling head may be a location in the log where new data is stored, and the tail may be a location in the log where the oldest data is stored. In some embodiments, the media cache 606 (or media cache mirror 608) may include multiple logs. In some examples, the logs may be physically adjacent, separate, may have different physical structures, different lengths, other characteristics, or any combination thereof.

The media cache segment may be stored to segment $S_{fh+1}$, which may be the next segment of the log. In some cases, space may be conserved by stripping the media cache segment(s) of its metadata. In embodiments, write data may be power loss protected even when it doesn't have a header or footer. The media cache segment may then be stored to the media cache mirror 608, at "D".

Figure 7:
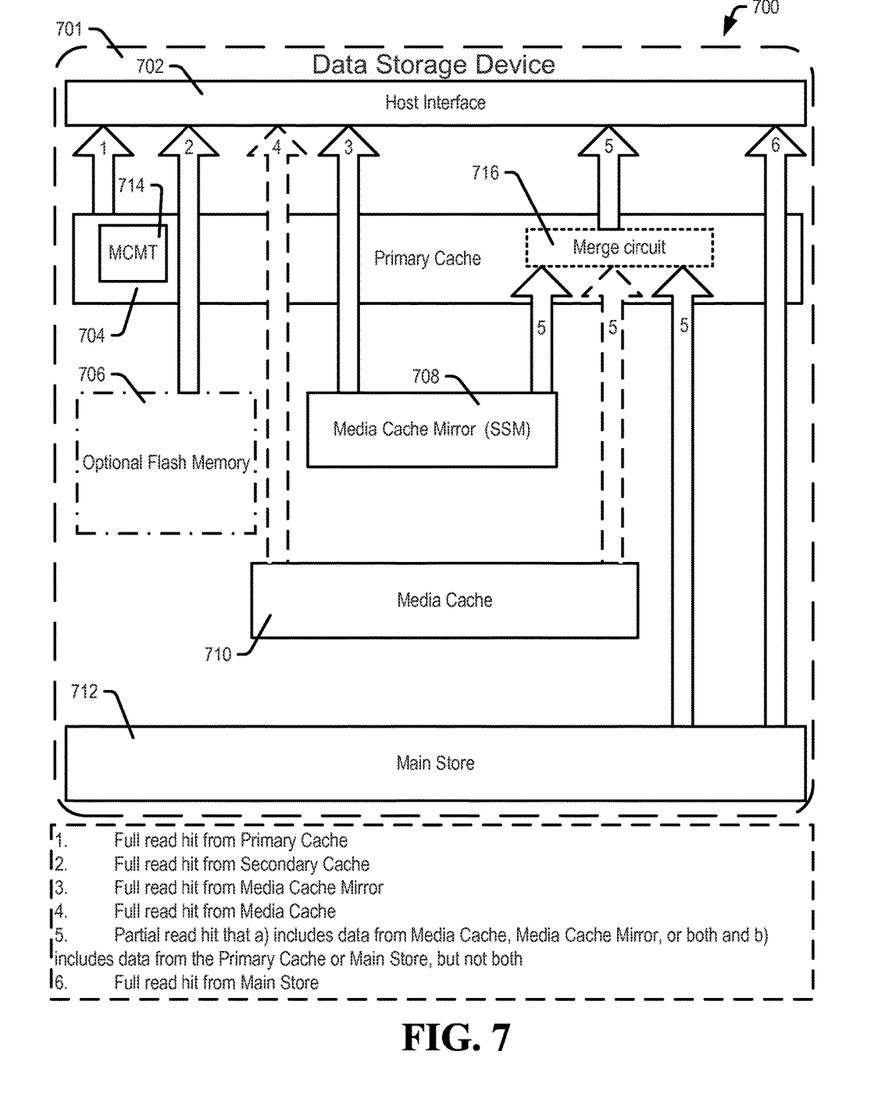
FIG. 7 is a diagram of a system of Cache Management in Data Storage Systems, in accordance with certain embodiments of the present disclosure.

Referring to FIG. 7, certain embodiments of Cache Management in Data Storage Systems are shown and generally designated 700. The system 700 is an example of system 300, according to certain embodiments. The system 700 can include a DSD 701, host interface 702, primary cache 704, and main store 712. The primary cache 704 can have an MCMT 714 and merge circuit 716. Further, the system 700 can include a media cache 710, media cache mirror 708, and optional flash memory 706.

During operation a host may issue a read command to get selected data. The selected data may be located in one or more memory locations. The DSD 701 may attempt to retrieve the selected data from memory locations in memory based on the access times and transfer rate of the memory or other performance characteristics.

In some cases, all of the requested selected data may be available in the primary cache, 704, and the read may be serviced as a primary cache hit. In some case, none of the selected data may be available in the primary cache 704, but all of the selected data may be available in the optional flash memory 706. The data may be copied from the optional flash memory 706 to the primary cache 704 and serviced as a primary cache hit.

In some cases, there may be a read miss (i.e. data could not be accessed or found) in the primary cache 704 and the optional flash memory 706. When all of the selected data is available or retrievable in the media cache mirror 708, the data can be copied from the media cache mirror 708 to the primary cache 704 and serviced as a primary cache hit.

From time to time, the selected data may not be available or retrievable from the primary cache 704, optional flash memory 706, or media cache mirror 708, but may be available in the media cache 710. The selected data may be copied from the media cache 710 to the primary cache 704 and serviced as a primary cache hit.

In some instances, only a portion of the selected data may be available in a memory, such as in the media cache mirror 708 or media cache 710. Remaining selected data can be sourced from another memory or memories, such as the main store 712 or primary cache 704. In some implementations, if the main store 712 is read, then any partial hits in the primary cache may be ignored and re-read from the main store 712. Portions of the selected data from the media cache mirror 708, media cache 710, or main store 712, may be merged in the merge circuit 716, and serviced as a primary cache hit.

In some examples, the main store 712 may have a valid copy of all of the selected data, and at least some portion of the selected data is only valid in the main store 712. The read may be serviced directly from the main store 712.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
   a memory;
   a solid state memory ("SSM");
   a first non-volatile memory ("NVM") configured to store selected data in a sequential manner;
   a second NVM;
   a circuit configured to:
      mirror the selected data to the first NVM and the SSM from the memory by both:
         storing the selected data from the memory to the first NVM; and
         storing the same selected data from the memory to the SSM as stored from the memory to the first NVM; and
      store, from the SSM to the second NVM, the selected data mirrored from the memory to the SSM.

2. The system of claim 1 further comprising:
   the first NVM is a media cache and the SSM is configured as a media cache mirror ("MCM") where the SSM also includes a portion configured to store data for input/output commands.

3. The system of claim 1 further comprising:
   the SSM is NAND flash.

4. The system of claim 2 further comprising:
   at least one of the first NVM and the second NVM is a magnetic disc memory.

5. The system of claim 4 further comprising:
   the memory includes a management table; and
   the management table includes a mapping of sequential ranges of logical block addresses corresponding to sequential data where the sequential data is located in at least one of the first NVM and the SSM.

6. The system of claim 2 further comprising:
   the memory includes a power loss protection portion, where data stored in the power loss protection portion can be stored to a non-volatile memory when power is lost.

7. The system of claim 4 further comprising:
   the second NVM is a magnetic disc memory and the first NVM is a reserved portion of the second NVM.

8. A method comprising:
   receiving selected data from a data source;
   storing the selected data to a memory;
   mirroring the selected data to the first NVM and the SSM from the memory by both:
      storing the selected data from the memory to a first non-volatile memory ("NVM"), where the first NVM is configured for sequential storage; and
      storing the same selected data from the memory to a solid state memory ("SSM") as stored from the memory to the first NVM; and
   storing, from the SSM to a second NVM, the selected data mirrored from the memory to the SSM.

9. The method of claim 8 further comprising:
   determining if a write command corresponding to the selected data is write cache enabled; and
   when the write command is write cache enabled, storing the selected data from the memory to one of the SSM and the second NVM, without storing the selected data from the memory to the first NVM.

10. The method of claim 9 further comprising:
    when the write command is not write cache enable, storing the selected data to a power protected portion of the memory and send a notice of completion to the data source.

11. The method of claim 10 further comprising:
    determining if storing the selected data in the first NVM is an optimal storage solution; and
    storing the selected data to the second NVM when storing the selected data in the first NVM is not the optimal storage solution.

12. The method of claim 11 further comprising:
    storing the selected data from the memory to the first NVM; and
    storing the selected data from the memory to the SSM.

13. The method of claim 12 further comprising:
    determining if a level of saturation of the SSM exceeds a threshold; and
    storing the selected data from the SSM to the second NVM when the level of saturation of the SSM exceeds the threshold.

14. The method of claim 13 further comprising:
    determining if some of the selected data is in the SSM and some of the selected data is in the first NVM.

15. The method of claim 14 further comprising:
    merging the selected data in the SSM and the selected data in the first NVM to produce merged data when some of the selected data is in the SSM and some of the selected data is in the first NVM; and
    storing the merged data to the second NVM.

16. The method of claim 15 further comprising:
storing the selected data from the first NVM to the second NVM.

17. The method of claim 8 further comprising:
aggregating logical block addresses (LBAs) corresponding to one or more selected data in the memory to produce aggregated LBAs; and
storing the aggregated LBAs in a management table.

18. The method of claim 17 further comprising:
storing the one or more selected data corresponding to the aggregated LBAs to the first NVM; and
storing the one or more selected data corresponding to the aggregated LBAs to the SSM.

19. A system comprising:
a memory;
a solid state memory ("SSM");
a first non-volatile memory ("NVM") configured to store selected data in a sequential manner;
a second NVM; and
a circuit configured to:
read the selected data from at least one of the memory, the SSM, the first NVM, and the second NVM based on a location of the selected data and performance characteristics of the memory, the SSM, the first NVM, and the second NVM, where the first NVM is a media cache and the SSM is configured as a media cache mirror ("MCM") mirroring at least a portion of the data stored in the first NVM; and
mirror the portion of the data to the first NVM and the SSM from the memory by both:
storing the selected data from the memory to the first NVM; and
storing the same selected data from the memory to the SSM as stored from the memory to the first NVM.

20. The system of claim 19 further comprising:
the first NVM is a media cache and the second SSM is configured as a media cache mirror and the SSM also includes a portion configured to store data for input/output commands; and
at least one of the first NVM and the second NVM is a magnetic disc memory.

21. The system of claim 20 further comprising:
the performance characteristics include at least one of a data access time and a data transfer rate.

* * * * *